United States Patent [19]

Sekido et al.

[11] 3,904,434

[45] Sept. 9, 1975

[54] SEALED LEAD STORAGE BATTERY

[75] Inventors: Satoshi Sekido, Kyoto; Sadau Fukuda, Daito; Masao Matsumoto, Chigasaki; Kaoru Murakami, Neyagawa, all of Japan

[73] Assignee: Matsushita Electric Industrial Co., Ltd., Kadoma, Japan

[22] Filed: Nov. 14, 1972

[21] Appl. No.: 306,407

[30] Foreign Application Priority Data

Nov. 17, 1971  Japan.............................. 46-92632
Nov. 17, 1971  Japan.............................. 46-92633

[52] U.S. Cl.................................. 136/26; 136/179
[51] Int. Cl................................. H01m 1/08
[58] Field of Search............................ 136/26–27, 136/24, 28–29, 30, 31, 20, 3, 179, 6 R, 6 G, 6 GC

[56] References Cited
UNITED STATES PATENTS

| | | | |
|---|---|---|---|
| 2,104,973 | 1/1938 | Dassler | 136/179 |
| 2,131,592 | 9/1938 | Lange et al. | 136/179 |
| 2,934,580 | 4/1960 | Neumann | 136/3 |
| 2,951,106 | 8/1960 | Ruetschi | 136/28 X |
| 3,080,440 | 3/1963 | Ruetschi et al. | 136/3 |
| 3,089,913 | 5/1963 | Garten et al. | 136/28 X |
| 3,174,879 | 3/1965 | Stanimirovitch | 136/6 |
| 3,208,880 | 9/1965 | Bode | 136/24 |
| 3,356,533 | 12/1967 | Carson, Jr. | 136/6 |
| 3,402,077 | 9/1968 | Kida et al. | 136/26 X |
| 3,457,112 | 7/1969 | Reber | 136/26 |
| 3,622,398 | 11/1971 | Sekido et al. | 136/179 |

*Primary Examiner*—Anthony Skapars
*Attorney, Agent, or Firm*—Stevens, Davis, Miller & Mosher

[57] ABSTRACT

A sealed lead storage battery which uses lead having an equilibrium potential electrochemically more negative than hydrogen potential as a negative electrode active material and a lead oxide as a positive electrode active material, in which a meniscus zone for vanishment of oxygen gas is formed at the negative electrode and a gas phase reaction catalyst for reacting hydrogen gas generated from the negative electrode to oxygen gas generated from the positive electrode is provided in a space on an electrolyte in the sealed cell.

6 Claims, 5 Drawing Figures

SEALED LEAD STORAGE BATTERY

The present invention relates to a sealed storage battery in which lead having an equilibrium potential which is electrochemically more negative than hydrogen potential and a lead oxide are used as active materials. More particularly, it relates to an improvement in a sealed lead storage battery and it provides a sealed lead storage battery where excess hydrogen gas generated when the battery is fresh and excess oxygen gas generated when the battery becomes old are avoided by automatic change of discharge depth at the negative electrode. A slight amount of hydrogen generated from the negative electrode is allowed to vanish together with oxygen on a gas phase reaction catalyst. The remaining oxygen is allowed to vanish by electrochemical reaction and gas phase reaction at the negative electrode. If oxygen evolution from the positive electrode decreases by the corrosion of positive grid material, the amount of oxygen which is absorbed by the negative electrode will decrease and consequently the discharge depth at the negative electrode will be decreased. Therefore, the excess hydrogen gas is avoided.

Attempts have been made to seal a lead or Ni-Cd storage battery for carrying convenience and for omitting the labor for pouring liquid. For example, in case of a Ni-Cd storage battery, Neuman et al have proposed a method according to which oxygen is generated from only a positive electrode and this oxygen is absorbed into a negative electrode having a meniscus zone. According to such method, the generated gas must be only oxygen, but in such lead storage battery using lead which has an equilibrium potential which is electrochemically more negative than hydrogen potential as an active material, the electrode potential markedly exceeds the electrolytic voltage of water and hydrogen is generated even when the negative electrode is in the partial discharge state. Therefore, a lead storage battery cannot be sealed by only said method. With such kind of battery, attempts (1) to directly react the generated gases by a gas catalyst to revert to water or (2) to electrochemically ionize the gases by the action of an auxiliary electrode electrically connected to a positive electrode or a negative electrode have been made. However, only the latter method succeeded in sealing a stationary, floating battery.

Furthermore, in the case of a battery having silica gel as an electrolyte and containing a gas phase reaction catalyst such as a Ni-Cd storage battery which uses an active material having an equilibrium potential more positive than hydrogen potential, the combination of a method by which oxygen is absorbed into the negative electrode and a method by which hydrogen and oxygen are combined into water by a gas phase reaction has been proposed. However, by such method, complete sealing is not possible for the following reasons.

That is, in the case of a lead storage battery, when the battery is relatively fresh, oxidation (corrosion) of the positive electrode grid and an increase in the X value of active material $PbO_x$ are caused and when the battery becomes old, shedding of active material of the positive electrode is caused. Therefore, even by any of said two methods, both oxygen and hydrogen are generated and either one of the gases remains. The degree of excessiveness of these gases varies depending upon charging current density and the number of charging and discharging, and the control of the excess gas is difficult.

For example, when hydrogen is excessive, the following can be considered as simple methods for removing the excessiveness, namely (i) discharge is allowed to automatically occur at the positive electrode in accordance with the excess hydrogen, (ii) charging is allowed to automatically occur in accordance with the excess hydrogen, (iii) oxygen is automatically taken in from outside in accordance with the excess hydrogen, etc. However, the method (i) is possible only when the charging current is small as in a floating charging since reaction speed is low. According to the method (ii), the battery must be assembled in such a manner that discharging at the negative electrode is deeper than that at the positive electrode. In this case, since even when the postive electrode is in the complete charging state, the negative electrode is in the partial discharging state, there is the possibility that oxygen which is generated in a large amount when the positive electrode is in the complete charging state cannot be absorbed by the negative electrode which is in the partial discharging state.

According to the present invention, it has been found that even when the capacity of the negative electrode is made greater than that of positive electrode by about 40 % and a partial discharge corresponding to said excess 40 % is carried out at the negative electrode, the negative electrode can absorb oxygen generated in charging of about 0.05 C with use of silica gel from which the electrolyte does not drop. Even in the higher charging rate, the absorption of oxygen is possible, for example, by connecting an auxiliary electrode comprising water-repellent treated active carbon to the negative electrode through a non-linear element which biases the voltage applied to the auxiliary electrode to 0.6–1.5 V. In case of a lead storage battery, which is different from the Ni-Cd storage battery disclosed by Neuman et al., generation of hydrogen cannot be avoided even when the negative electrode is in the partial discharge state. Of course, it is necessary that the oxygen absorption rate of the negative electrode is high, but when the gas phase reaction rate is lower than said oxygen absorption rate, hydrogen generated from the negative electrode remains. Therefore, for avoiding the excessiveness of hydrogen, the following requirement must be satisfied, namely, (gas phase reaction rate)>(oxygen vanishing rate at the negative electrode)>(gas generating rate from the positive electrode).

The gist of the present invention is to provide a method which satisfies the above requirements to make it possible to completely seal a lead storage battery. This method also contributes to overcoming excessiveness of oxygen as mentioned hereinafter.

As to the method (iii), the inventors have proposed an artificial graphite carrier to a part of which is added Pd black and to the other part of which is not added Pd black and two parts which are piled on and pressed into a mold. The artificial graphite carrier is mounted to a container by piercing there-through in such a manner that the part to which no Pd black is added is outside the container, whereby if the two parts are connected by a liquid-junction, the inner part to which Pd black is added acts as a hydrogen electrode and the outer part to which no Pd black is added acts as an oxygen electrode whereby oxygen in the air is automatically supplied to overcome the excessiveness of hydrogen. However, since according to this method the oxygen is supplied from the air, it is impossible to use the battery outside the air or in water.

Next, when oxygen is in excess, the following are simple methods for overcoming the excessiveness, namely, (i) charging is allowed to automatically occur at the positive electrode depending upon excess oxygen and (ii) discharging is allowed to automatically occur at the negative electrode depending upon excess oxygen. Both of the methods (i) and (ii) can be employed, but it is naturally desired to use said method together with the method for removing the excessiveness of hydrogen.

The present invention will be explained below in detail with reference to the drawing.

Figure 1:
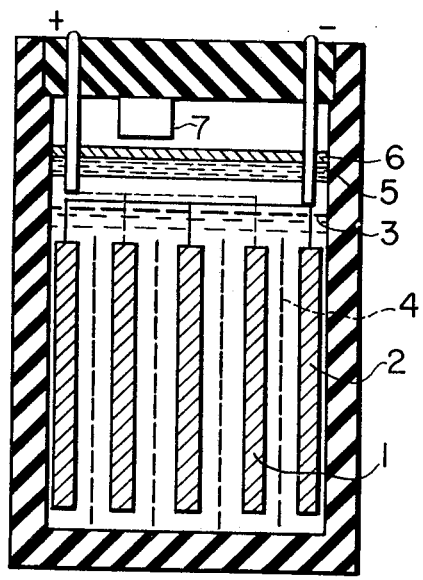
FIG. 1 is a longitudinal sectional view of a sealed lead storage battery of one embodiment of the present invention.

In general, generation of excess hydrogen in a lead storage battery occurs when the battery is fresh and the grid part is corroded or the X value in the positive electrode active material $PbO_x$ is increased and more particularly it occurs during the period until shedding of active material of the positive electrode 1 begins. The excess amount corresponds to at most 40 % of discharge capacity. Therefore, the battery is constructed in such a manner that the discharge capacity of the negative electrode 2 is larger than that of positive electrode 1 by more than 40 % and discharge at the negative electrode is carried out in such a state that the discharge is more than the discharge at the positive electrode by 40 %. In an ordinary lead storage battery, since the number of negative electrodes 2 is greater than that of the positive electrodes 1 by one piece and if discharge capacity per one piece is larger than that of the positive electrode 1, it is not necessary to make the thickness of the negative electrode thicker.

As electrolyte 3, a gel obtained by adding to 20 % silica sol concentrated sulfuric acid in a proportion of 2 cc per 1 g of $SiO_2$ is used. A group of plates which comprises separators 4 and plates whose discharge capacity has been adjusted in $H_2SO_4$ having a specific gravity of 1.28 as mentioned before and from which $H_2SO_4$ is lightly squeezed out is immediately dipped in said gel and shaken to remove bubbles. The gel layer is filled up to 5–7 mm from the electrode plates and glass wool 5 (pore diameter $9\mu$ and a thickness under a pressure of 10 kg/cm$^3$) is placed on the gel layer and, furthermore, a hard porous plate 6 is placed on said glass wool. The resultant assembly is inverted to be sufficiently drained.

Figure 2:
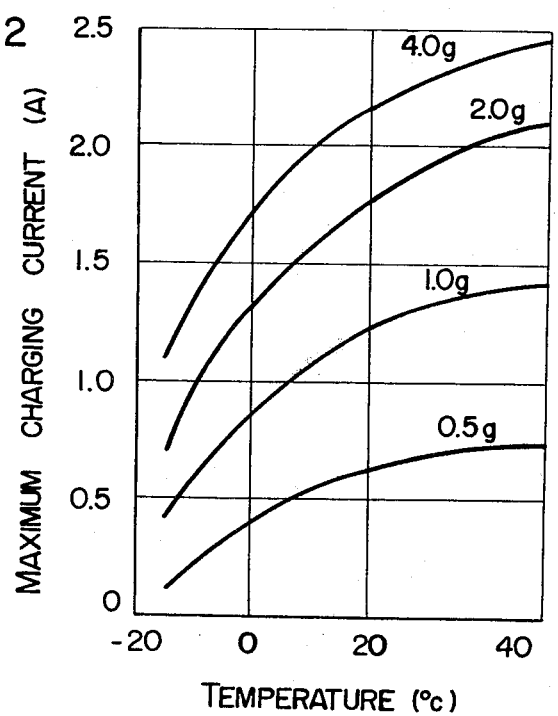
FIG. 2 is a characteristic graph which shows the relation between the amount of gas phase reaction catalyst, ambient temperature and safety maximum charging current.
Figure 3:
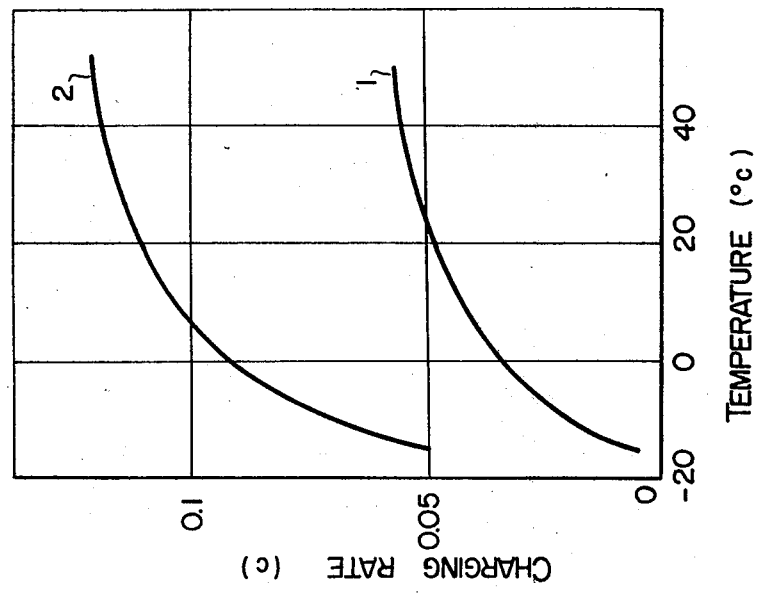
FIG. 3 is a characteristic graph which shows the relation between ambient temperature and safety maximum charging current depending upon the presence or absence of an auxiliary electrode.

A gas reaction catalyst 7 is prepared by molding a mixture of artificial graphite powders of less than −300 meshes to which 1 % by weight of Pd and 20 % of tetrafluoroethylene-hexafluoropropylene copolymer are added and heating the mold product at 370°C for 1 hour in $N_2$ atmosphere. The resultant gas phase reaction catalyst 7 is provided in the space within the cell and then it is sealed. The minimum amount of the catalyst is determined depending upon ambient temperature and charging current as shown in FIG. 2. FIG. 2 shows the characteristic at various amounts of the catalyst when a carrier having a diameter of 13 mm is used and the battery capacity is 2.4 AH. Moreover, maximum charging current with changes of ambient temperature of a battery provided with a gas phase reaction catalyst to which 2 g of catalyst is added is shown by curve 1 in FIG. 3.

Figure 4:
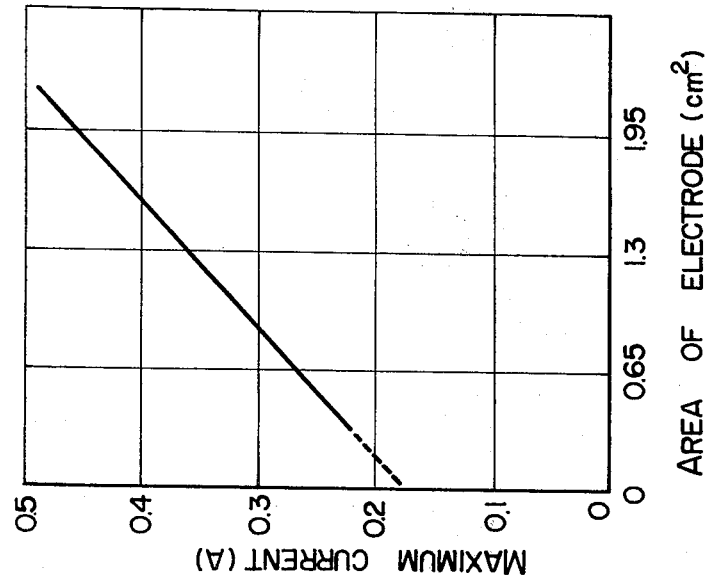
FIG. 4 is a characteristic graph which shows the relation between the sectional area of the auxiliary electrode and safety maximum charging current.
Figure 5:
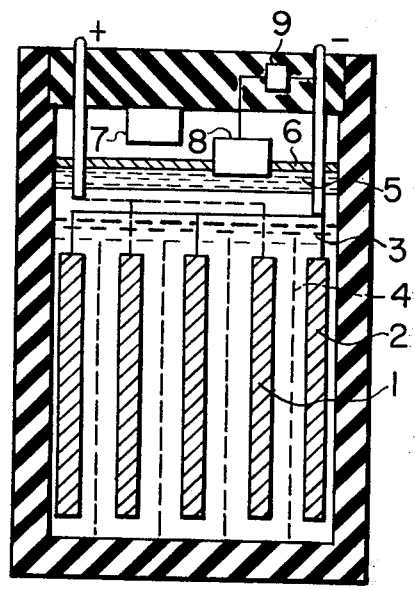
FIG. 5 is a longitudinal sectional view of a sealed lead storage battery of another embodiment of the present invention.

Furthermore, as shown in FIG. 5, auxiliary electrode 8 which is a third electrode and produced by adding 20 % of a tetrafluoroethylene-hexafluoropropylene copolymer to a carbon material, e.g. active carbon to which Pt or Pd is added and molding the mixture to an electrode having a diameter of 13 mm and a thickness of 10 mm is placed on the electrolyte to form a miniscus zone which is a three phase zone of gas-liquid-solid phase ($O_2$-electrode-auxiliary electrode). This auxiliary electrode is connected with silver lead to negative electrode 2 through non-linear element 9 such as a silicon varistor having a flat characteristic at 0.6 V–1.5 V to further increase the charging current as shown by curve 2 in FIG. 3. This current is considered due to the contact area with the electrolyte, and the relation between the contact area and the flowable maximum charging current is shown in FIG. 4.

As mentioned above, according to the present invention, the discharge capacity of the negative electrode is made larger than that of the positive electrode and a battery is constructed in such a state that discharge at the negative electrode is made greater by the degree corresponding to the excess of capacity than that at the positive electrode. After the excess liquid has been removed, the electrolyte is filled and a gas phase reaction catalyst is provided in the space within the battery, whereby oxygen gas generated from the positive electrode is absorbed in the negative electrode and at the same time hydrogen gas generated from negative electrode is reacted with oxygen gas on the gas phase reaction catalyst to revert them to water. Especially, when the amount of oxygen gas generated is reduced due to corrosion of the plate grid or oxidation of active materials, excess of hydrogen gas is avoided by charging the negative active material in the discharge state.

Moreover, high rate charging is possible by applying the gas phase reaction catalyst and auxiliary electrode to the method of Neuman et al. as shown in FIG. 5.

As explained above, even in the case of a lead storage battery in which the generation of hydrogen gas from the negative electrode cannot be avoided even in the incomplete charging state, a completely sealed battery in which elevation of the inner pressure of the cell can be inhibited and which is convenient for carrying and requires no cares such as pouring of liquid, etc. can be provided by forming an electrode group where the capacity of the negative electrode is greater than that of the positive electrode and discharge at the positive electrode is made greater by the degree corresponding to said excess of capacity and by carrying out the absorption of oygen gas generated from the positive electrode into the negative electrode and vanishment of hydrogen gas generated from the negative electrode itself by a gas phase reaction catalyst or a third electrode.

What is claimed is:

1. A sealed lead storage battery, comprising a negative electrode active material including lead having an equilibrium potential electrochemically more negative than hydrogen potential and a positive electrode active material including lead oxide, the discharge capacity of said negative electrode active material being greater than that of the positive electrode active material, the excess capacity being previously discharged and simultaneously a meniscus zone including a three-phase zone of a gas phase-liquid phase-solid phase for vanishment of oxygen being formed on the negative electrode active material, and a gas phase reaction catalyst for reacting oxygen gas and hydrogen gas generated from the negative electrode active material for such vanishment being provided in a space formed on an acid gelled electrolyte, and wherein the relation of the gas phase reaction rate of said gas phase reaction catalyst>the oxygen vanishing rate at said negative electrode active material>the oxygen generating rate from said positive electrode active material is maintained.

2. A sealed lead storage battery according to claim 1, wherein an auxiliary electrode having a meniscus zone in which oxygen gas is ionized is connected to the negative electrode active material through a non-linear element.

3. A sealed lead storage battery according to claim 1, wherein the gas phase reaction catalyst is obtained by molding and heating a mixture comprising artificial graphite powders of less than −300 meshes, a catalyst metal and fluorine-contained resin.

4. A sealed storage battery according to claim 2, wherein the auxiliary electrode is obtained by molding carbon material to which a catalyst metal and fluorine-contained resin are added.

5. A sealed storage battery according to claim 1, wherein the discharge capacity of the negative electrode active material is greater by more than 40 % than that of the positive electrode active material, the electrolyte is silica gel gelled with sulfuric acid and the gas phase reaction catalyst comprises a platinum group metal supported carrier which is subjected to water-repellent treatment.

6. A sealed lead storage battery according to claim 2, wherein the auxiliary electrode is a water-repellent active carbon.

* * * * *